United States Patent
Aketagawa et al.

(10) Patent No.: US 11,987,498 B2
(45) Date of Patent: May 21, 2024

(54) GAS PRODUCTION SYSTEM AND GAS PRODUCTION METHOD

(71) Applicants: Mitsubishi Electric Corporation, Tokyo (JP); Tokyo Institute of Technology, Tokyo (JP)

(72) Inventors: Kyohei Aketagawa, Tokyo (JP); Isamu Hirashiki, Tokyo (JP); Tomohiro Nozaki, Tokyo (JP); Kenta Sakata, Tokyo (JP)

(73) Assignees: MITSUBISHI ELECTRIC CORPORATION, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 88 days.

(21) Appl. No.: 17/432,532

(22) PCT Filed: Apr. 23, 2019

(86) PCT No.: PCT/JP2019/017116
§ 371 (c)(1),
(2) Date: Aug. 20, 2021

(87) PCT Pub. No.: WO2020/217289
PCT Pub. Date: Oct. 29, 2020

(65) Prior Publication Data
US 2022/0144631 A1    May 12, 2022

(51) Int. Cl.
*C01B 3/26* (2006.01)
*C01B 3/34* (2006.01)
(52) U.S. Cl.
CPC ............. *C01B 3/26* (2013.01); *C01B 3/342* (2013.01); *C01B 2203/0861* (2013.01); *C01B 2203/16* (2013.01)

(58) Field of Classification Search
CPC ... C01B 3/26; C01B 3/342; C01B 2203/0861; C01B 2203/16
See application file for complete search history.

(56) References Cited

U.S. PATENT DOCUMENTS

| | | | |
|---|---|---|---|
| 6,136,278 A | 10/2000 | Eliasson et al. | |
| 8,021,448 B2 * | 9/2011 | Zhu .................. | B82Y 30/00 204/157.43 |

(Continued)

FOREIGN PATENT DOCUMENTS

| | | |
|---|---|---|
| JP | 2002-241774 A | 8/2002 |
| JP | 2005-35852 A | 2/2005 |

(Continued)

OTHER PUBLICATIONS

Machine Translation KR102305813 B1 (Feb. 15, 2013) (Year: 2013).*

(Continued)

*Primary Examiner* — Matthew J Merkling
(74) *Attorney, Agent, or Firm* — XSENSUS LLP

(57) ABSTRACT

This gas production system includes: a gas production device having a reactor forming a flow path for a treatment target gas, a first electrode and a second electrode to which voltage is applied, and a catalyst layer provided in the flow path and containing a catalyst; voltage generation means for generating voltage to be applied to the first electrode and the second electrode; and gas supply means for supplying the treatment target gas to the gas production device. The voltage generation means has frequency setting means for setting the frequency of the voltage in accordance with the treatment target gas, plasma generated between the first electrode and the second electrode is applied to the catalyst layer, and the treatment target gas is reformed to obtain a product gas.

14 Claims, 5 Drawing Sheets

(56) References Cited

U.S. PATENT DOCUMENTS

| | | | |
|---|---|---|---|
| 2003/0091502 A1* | 5/2003 | Holladay | B01J 19/0093 |
| | | | 423/652 |
| 2003/0221949 A1* | 12/2003 | Rabinovich | C01B 3/342 |
| | | | 422/186.04 |
| 2006/0280678 A1 | 12/2006 | Lee et al. | |
| 2008/0107592 A1* | 5/2008 | Adams | C01B 3/323 |
| | | | 123/3 |
| 2010/0135870 A1 | 6/2010 | Mizuno et al. | |
| 2014/0219894 A1 | 8/2014 | Ikegami et al. | |
| 2015/0311680 A1* | 10/2015 | Burrows | F02P 23/04 |
| | | | 315/210 |
| 2022/0080379 A1* | 3/2022 | Soane | H05H 1/4622 |

FOREIGN PATENT DOCUMENTS

| | | |
|---|---|---|
| KR | 2015-0139040 A | 12/2015 |
| WO | 2013/042328 A1 | 3/2013 |

OTHER PUBLICATIONS

International Search Report and Written Opinion dated Jun. 18, 2019, received for PCT Application PCT/JP2019/017116, Filed on Apr. 23, 2019, 9 pages including English Translation.

Extended European search report dated Mar. 23, 2022, in corresponding European patent Application No. 19925951.6, 7 pages.

Chinese Office Action dated Apr. 26, 2023 in corresponding Chinese Patent Application No. 201980095514.0 (with machine-generated English translation), 17 pages.

Office Action dated Aug. 16, 2023 in European Patent Application No. 19 925 951.6, 6 pages.

Office Action dated Oct. 19, 2023, in Chinese Patent Application No. 201980095514.0, 13 pages.

* cited by examiner

GAS PRODUCTION SYSTEM AND GAS PRODUCTION METHOD

CROSS-REFERENCE TO RELATED APPLICATION

The present application is based on PCT filing PCT/JP2019/017116, filed Apr. 23, 2019, the entire contents of which are incorporated herein by reference.

TECHNICAL FIELD

The present disclosure relates to a gas production system and a gas production method.

BACKGROUND ART

Conventionally, there has been known a method using a catalyst for producing useful gases such as hydrogen gas and ammonia gas. In this production method, a mixed gas composed of two or more kinds containing a source gas serving as a source of a product gas and an oxidant gas for oxidizing the source gas is introduced as a treatment target gas into a catalyst reaction field, and the treatment target gas is reacted under a high-temperature environment, whereby the product gas is produced.

In a case where the treatment target gas is a mixed gas containing a hydrocarbon-based gas and water vapor or a molecular oxygen containing gas, hydrogen gas can be produced as a product gas (for example, Patent Document 1). In a case where the treatment target gas is a mixed gas containing hydrogen gas and carbon monoxide gas, methane gas, an alcohol, or the like can be produced as a product gas, and in a case where the treatment target gas is a mixed gas containing a hydrocarbon-based gas and air, ammonia gas can be produced as a product gas (for example, Patent Document 2).

In the above gas production methods, in order to increase the yield (production amount) of the product gas, it is necessary to set the environment of the catalyst reaction field to an extremely high temperature, so that great thermal energy needs to be inputted. Therefore, energy efficiency is low and the production cost for the product gas is high. Accordingly, improvement of energy efficiency in production of the product gas is required.

As an example of a method for improving energy efficiency in production of the product gas, a gas production method using plasma is known, and plasma is also used in Patent Document 1 and Patent Document 2. In these documents, a pair of electrodes connected to a power supply capable of generating high voltage are provided at a catalyst reaction field, and high voltage is applied to the electrodes, whereby plasma is generated in the catalyst reaction field. A gas reactive material in the treatment target gas is excited by the plasma, and thus it can be expected that the yield of the product gas and energy efficiency are improved.

CITATION LIST

Patent Document

Patent Document 1: Japanese Laid-Open Patent Publication No. 2005-35852
Patent Document 2: Japanese Laid-Open Patent Publication No. 2002-241774

SUMMARY OF THE INVENTION

Problems to be Solved by the Invention

When plasma is generated in the catalyst reaction field, an electron in the plasma collides with the gas reactive material in the treatment target gas, and depending on the electron's energy (electronic energy), the gas reactive material comes into an ionized or dissociated state, or a vibrational excited state. In order to increase the yield of the product gas and improve energy efficiency, it is necessary to promote vibrational excitation of the gas reactive material, instead of ionization or dissociation. The electronic energy that can promote vibrational excitation differs depending on the kind of the treatment target gas. Therefore, if the electronic energy corresponding to the kind of the treatment target gas cannot be supplied, on the contrary, energy efficiency might be reduced.

In the conventional gas production system using catalyst reaction and plasma, if the frequency of high voltage applied to the electrodes by the power supply is extremely low, plasma having great electronic energy is generated. In this case, there is a high risk that the gas reactive material in the treatment target gas is ionized or dissociated, and thus vibrational excitation of the gas reactive material might not be efficiently promoted. As a result, the yield of the product gas and energy efficiency are reduced. On the other hand, if the frequency of high voltage of the power supply is extremely high, the frequency at which plasma is generated in the catalyst reaction field, in other words, the density of electrons becomes excessive, and power consumption needed for generating plasma increases, so that energy efficiency is reduced.

The present disclosure has been made to solve the above problem, and an object of the present disclosure is to provide a gas production system and a gas production method in which electronic energy of plasma is appropriately set in accordance with a treatment target gas so that a synergistic effect of a combination of catalyst reaction and plasma is obtained, whereby the yield of the product gas can be increased and the product gas can be produced with high energy efficiency.

Solution to the Problems

A gas production system according to the present disclosure is a gas production system which applies plasma to a catalyst and reforms a treatment target gas to produce a product gas, the gas production system including: voltage generation means for generating voltage; plasma generation means for generating the plasma to be applied to the catalyst, using the voltage generated by the voltage generation means; and frequency setting means for setting a frequency of the voltage in accordance with the treatment target gas, wherein the treatment target gas is a hydrocarbon-based gas and an oxidant gas, and the product gas is a hydrogen containing gas.

A gas production method according to the present disclosure is a gas production method in which plasma is applied to a catalyst layer containing a catalyst and a treatment target gas is reformed to produce a product gas, the gas production method including: a gas supply step of supplying the treatment target gas to the catalyst layer; a voltage generation step of generating voltage for generating the plasma; a plasma application step of generating the plasma using the voltage generated in the voltage generation step, and applying the plasma to the catalyst layer; a frequency setting step of setting a frequency of the voltage in accordance with the treatment target gas; a reforming step of reforming the treatment target gas and producing the product gas; and a depressurizing step of reducing a pressure in the catalyst layer.

Effect of the Invention

In the gas production system and the gas production method according to the present disclosure, the frequency of voltage for generating plasma is set in accordance with the treatment target gas, thus making it possible to provide a gas production system and a gas production method in which a synergistic effect of a combination of catalyst reaction and plasma is obtained, whereby the yield of the product gas can be increased and the product gas can be produced with high energy efficiency.

DESCRIPTION OF EMBODIMENTS

Figure 1A:
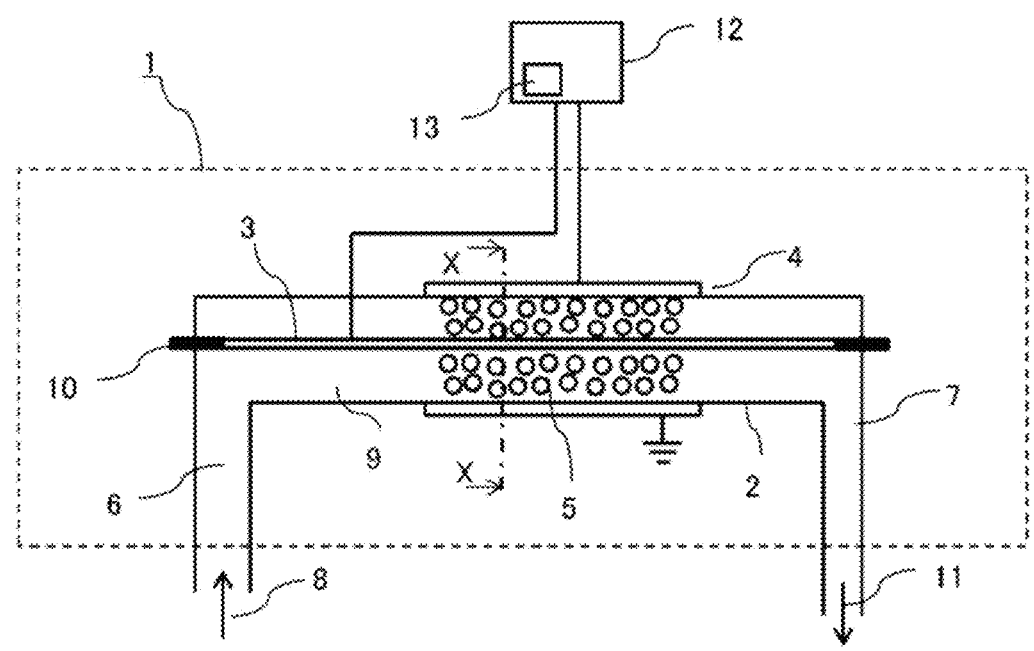
FIG. 1A schematically shows the configuration of a gas production system according to embodiment 1.

Hereinafter, embodiments of a gas production system and a gas production method will be described with reference to the drawings. It is noted that the embodiments described below are merely examples and are not intended to limit the present invention. In the drawings, the same reference characters denote the same or corresponding parts.

Embodiment 1

Hereinafter, a gas production system according to embodiment 1 will be described. FIG. 1A schematically shows the configuration of the gas production system according to embodiment 1. The gas production system includes: a gas production device 1 having a reactor 2, a first electrode 3 and a second electrode 4 for generating plasma, and a catalyst layer 5; an external power supply 12 connected to the first electrode 3 and the second electrode 4 and configured to supply power; and the like. In FIG. 1A, the cross section of the gas production device 1 is shown.

The gas production device 1 includes a supply portion 6 and a flow-out portion 7, and the supply portion 6 and the flow-out portion 7 are connected to the reactor 2. The reactor 2 forms a flow path 9 through which a treatment target gas 8 flows, and the treatment target gas 8 is supplied from the supply portion 6 into the reactor 2. The first electrode 3 is provided inside the reactor 2, and the second electrode 4 is provided outside the reactor 2. The second electrode 4 is grounded, and the first electrode 3 is connected to the reactor 2 via a supporter 10 and is fixed in a state of being insulated from the second electrode 4. In a space between the first electrode 3 and the second electrode 4 in the flow path 9, the catalyst layer 5 is provided and includes a catalyst for causing a reaction of reforming the treatment target gas 8 into a product gas 11. The product gas 11 reformed through the catalyst reaction in the catalyst layer 5 is sent though the flow-out portion 7 to the outside of the gas production device 1.

The first electrode 3 and the second electrode 4 are connected to the external power supply 12, and the external power supply 12 generates high voltage to generate plasma in the space between the first electrode 3 and the second electrode 4. The type of the plasma is not particularly limited, but in terms of energy efficiency, a preferable type is non-equilibrium plasma in which only the electron temperature is high and thus the catalyst reaction of the treatment target gas 8 can be activated at a comparatively low temperature.

Figure 1B:
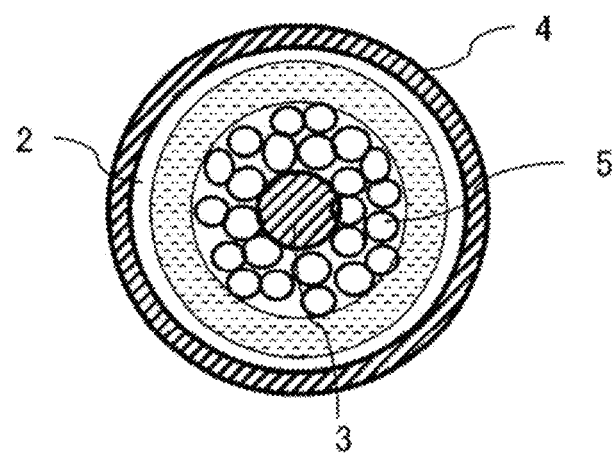
FIG. 1B schematically shows a sectional view along line X-X in FIG. 1A.

The configuration of the gas production device 1 is not particularly limited as long as the gas production device 1 includes the reactor 2, the first electrode 3, and the second electrode 4, and the treatment target gas 8 is supplied to the catalyst layer 5 provided in the space between the first electrode 3 and the second electrode 4. However, in order to efficiently activate the catalyst reaction of the treatment target gas 8, it is preferable that the plasma can be generated along the surface of the catalyst in the catalyst layer 5, and it is preferable that the gas production device 1 has a cylindrical shape. FIG. 1B schematically shows a sectional view along line X-X in FIG. 1A. As shown in FIG. 1B, it is preferable that the reactor 2 and the second electrode 4 have cylindrical shapes, the reactor 2 is coated with the second electrode 4, and the first electrode 3 has a bar shape and is placed on the center axis of the reactor 2.

The materials of the first electrode 3 and the second electrode 4 are not particularly limited as long as they can generate plasma with high voltage from the external power supply 12, and may be known materials such as copper, iron, and tungsten. In view of corrosion of the electrodes, an alloy such as stainless steel resistant to corrosion is preferably used. In addition, the material of the reactor 2 is preferably a dielectric material, and may be a known material such as ceramic or glass.

The form of the catalyst forming the catalyst layer 5 is not particularly limited, and may be a pellet form, a granular form, or the like.

While the treatment target gas 8 is being supplied from the supply portion 6 into the reactor 2, when high voltage is generated by the external power supply 12, plasma can be generated in the catalyst layer 5 provided in the space between the first electrode 3 and the second electrode 4 in the reactor 2. In the catalyst layer 5, the treatment target gas 8 is reformed into the product gas 11.

The external power supply 12 is provided with frequency setting means 13 for setting the frequency of the high voltage to be generated, whereby the frequency of plasma to be generated in the catalyst layer 5 provided in the space between the first electrode 3 and the second electrode 4 in the reactor 2 can be appropriately set in accordance with the treatment target gas 8. The electronic energy of the generated plasma is determined depending on the frequency of the power supply (plasma). Therefore, by appropriately setting the frequency using the frequency setting means 13, it is possible to set such electronic energy that can efficiently promote vibrational excitation of molecules of the gas reactive material constituting the treatment target gas 8.

It is noted that the electronic energy that can efficiently promote vibrational excitation of molecules of the gas reactive material constituting the treatment target gas 8 is calculated by the Boltzmann equation which describes the effect of collision between particles (collision between the treatment target gas 8 and an electron in the plasma), and has been found for each kind of the treatment target gas 8.

Therefore, if the frequency of high voltage of the external power supply 12 is lower than necessary, plasma having great electronic energy is generated, so that there is a high risk that the gas reactive material in the treatment target gas 8 is ionized or dissociated. Thus, vibrational excitation of the gas reactive material cannot be efficiently promoted, and therefore the yield of the product gas 11 and energy efficiency are reduced. On the other hand, if the frequency of high voltage of the external power supply 12 is higher than necessary, the frequency at which plasma is generated in the catalyst layer 5, in other words, the density of electrons becomes excessive, and power consumption needed for generating plasma increases, so that energy efficiency is reduced. In the present embodiment, these can be suppressed by controlling the frequency of high voltage of the external power supply 12.

The external power supply 12 for generating high voltage is not particularly limited and may be a known power supply such as an AC power supply or a pulse power supply. Therefore, the signal waveform of the external power supply 12 may be a sine wave, a pulse wave, a rectangular wave, or the like, and is not particularly limited.

The frequency setting means 13 is not particularly limited as long as the frequency of high voltage to be generated by the external power supply 12 can be set, and for example, an inverter, a frequency conversion device, or the like can be used. The frequency setting means 13 may be connected outside the external power supply 12, or may be provided in the external power supply 12. The frequency set by the frequency setting means 13 is, for example, a frequency represented by the reciprocal of the cycle if the signal waveform of the external power supply 12 is a sine wave or a rectangular wave, or is a repetition frequency represented by the number of times a pulse wave is repeated per unit time if the signal waveform of the external power supply 12 is a pulse wave.

The range of the frequency of high voltage of the external power supply 12 set by the frequency setting means 13 may be set to such a range that vibrational excitation of molecules of the gas reactive material constituting the treatment target gas 8 can be efficiently promoted by the plasma and the frequency at which the plasma is generated in the catalyst layer 5, in other words, the density of electrons does not become excessive. The range is preferably not less than 50 Hz and not greater than 13.56 MHz, more preferably not less than 10 kHz and not greater than 1 MHz, and even more preferably not less than 10 kHz and not greater than 500 kHz. If the frequency is lower than the above range, plasma having great electronic energy is generated, so that there is a high risk that the gas reactive material in the treatment target gas 8 is ionized or dissociated. Thus, vibrational excitation of the gas reactive material cannot be efficiently promoted, and therefore the yield of the product gas 11 and energy efficiency are likely to be reduced. On the other hand, if the frequency is higher than the above range, the frequency at which plasma is generated in the catalyst layer 5, in other words, the density of electrons becomes excessive, and power consumption needed for generating plasma increases, so that energy efficiency is likely to be reduced. In accordance with the treatment target gas, the frequency is set within the above frequency range.

The magnitude of high voltage generated by the external power supply 12 may be adjusted as appropriate so that plasma can be generated in the range of the frequency of high voltage of the external power supply 12 set by the frequency setting means 13, i.e., the set range of the electronic energy. However, if the magnitude of high voltage is extremely small, plasma cannot be generated, and on the other hand, if the magnitude of high voltage is extremely great, power consumption increases and energy efficiency is reduced. Therefore, the magnitude of high voltage is preferably not less than 0.5 kV and not greater than 10 kV, and more preferably not less than 1 kV and not greater than 5 kV.

Figure 2:
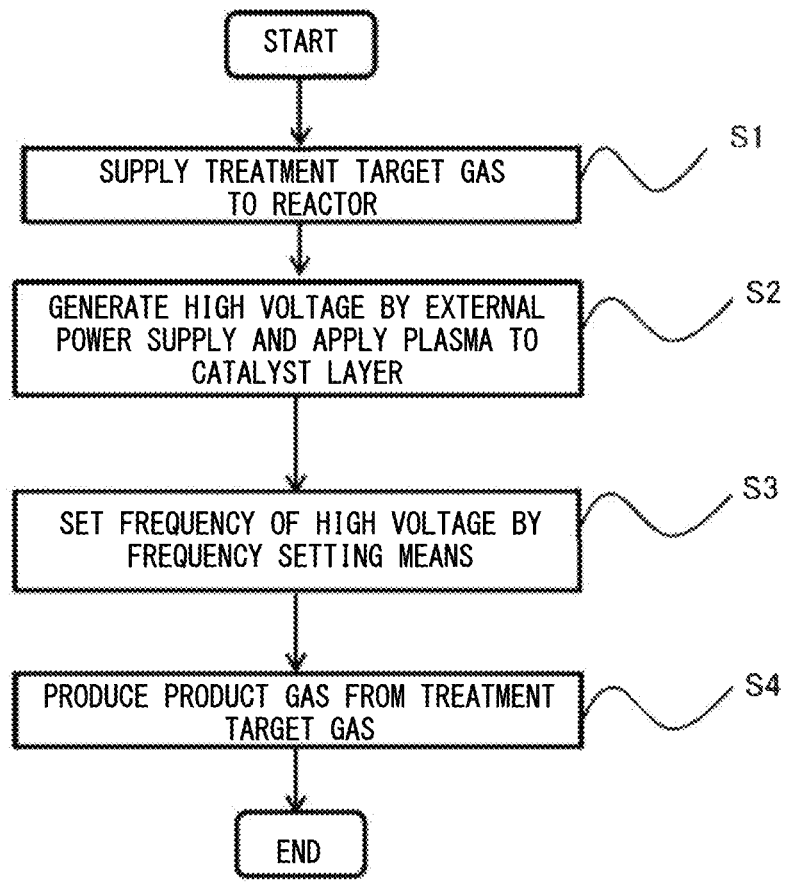
FIG. 2 is a chart showing an operation flow of the gas production system according to embodiment 1.

FIG. 2 is a chart showing an operation flow of the gas production system according to embodiment 1, and shows a production method for the product gas. This gas production method includes a gas supply step, a voltage generation step, a plasma application (generation) step, a frequency setting step, and a reforming step.

First, in the gas supply step in step S1, the treatment target gas 8 is supplied to the catalyst layer 5 provided in the space between the first electrode 3 and the second electrode 4 in the reactor 2. This step S1 is an example of the supply step.

Subsequently, in step S2, plasma is generated by high voltage generated by the external power supply 12 connected to the first electrode 3 and the second electrode 4, whereby plasma is applied to the catalyst layer 5. This step S2 is an example of the voltage generation step and the plasma application step.

In step S3 after plasma is generated in step S2, the frequency of high voltage generated by the external power supply 12 is set by the frequency setting means 13. The frequency is set in accordance with the treatment target gas 8, whereby the electronic energy of the plasma is set appropriately. This step S3 is an example of the frequency setting step.

With the frequency of the high voltage set in step S3, the treatment target gas 8 is reformed by plasma in the catalyst layer 5, thus producing the product gas 11 (step S4). When a predetermined product gas amount is reached, the gas production is finished. This step S4 is an example of the reforming step.

As described above, the gas production system according to embodiment 1 includes the frequency setting means 13 for setting the frequency of high voltage generated by the external power supply 12, in accordance with the treatment target gas 8, whereby it is possible to appropriately set the electronic energy of plasma generated in the catalyst layer 5 provided in the space between the first electrode 3 and the second electrode 4 in the reactor 2. Thus, a synergistic effect of a combination of catalyst reaction and plasma is obtained, whereby the yield of the product gas can be increased and the product gas can be produced with high energy efficiency.

In embodiment 1, it has been described that the cross sections of the reactor 2 and the second electrode 4 have annular shapes, the reactor 2 is coated with the second electrode 4, and the first electrode 3 has a bar shape and is placed on the center axis of the reactor 2, as an example of the configuration. However, the present invention is not limited to the above example. For example, the cross sections of the reactor 2 and the second electrode 4 may be rectangular shapes as long as the same function is obtained.

Embodiment 2

Hereinafter, a gas production system according to embodiment 2 will be described. The configuration and the operation of the gas production system according to embodiment 2 are basically the same as those in embodiment 1, while a difference is that, instead of the treatment target gas 8, a hydrocarbon-based gas 14 and an oxidant gas 15 are supplied to the gas production device 1, and instead of the product gas 11, a hydrogen containing gas 16 is sent through the flow-out portion 7 to the outside of the gas production device 1.

Figure 3:
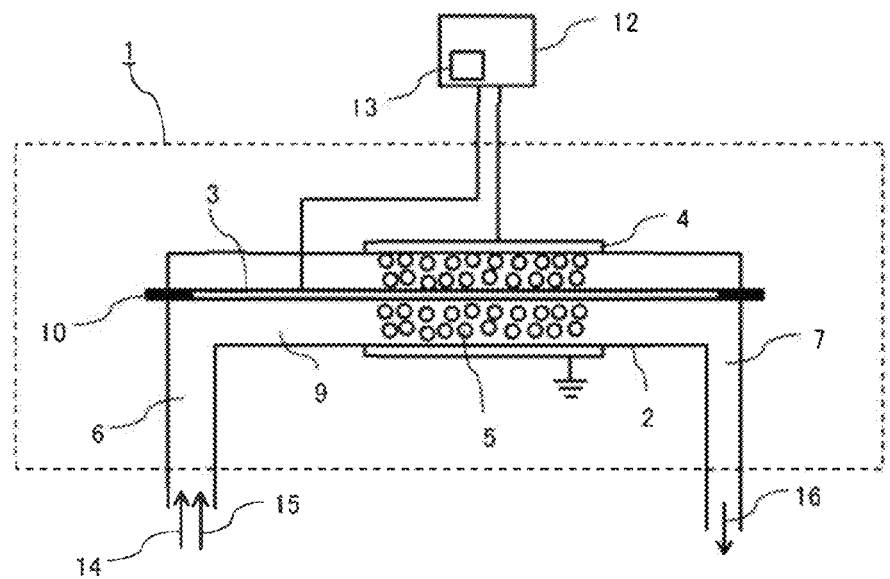
FIG. 3 schematically shows the configuration of a gas production system according to embodiment 2.

FIG. 3 schematically shows the configuration of the gas production system according to embodiment 2. In the drawing, the same components and members as those of the gas production system according to embodiment 1 are denoted by the same reference characters, and description thereof is omitted unless particularly needed.

In the gas production system according to embodiment 2, the hydrocarbon-based gas 14 and the oxidant gas 15 are supplied from the supply portion 6 into the reactor 2. While the hydrocarbon-based gas 14 and the oxidant gas 15 are being supplied into the reactor 2, high voltage is generated by the external power supply 12, to generate plasma in the catalyst layer 5 provided in the space between the first electrode 3 and the second electrode 4 in the reactor 2. The hydrocarbon-based gas 14 and the oxidant gas 15 react in the catalyst layer 5 and thus the hydrogen containing gas 16 is produced.

At this time, by the frequency setting means 13, the frequency of the high voltage generated by the external power supply 12 is set so that the electronic energy of the plasma is appropriately set, thereby obtaining a synergistic effect of a combination of catalyst reaction and plasma. Thus, the yield of hydrogen gas in the hydrogen containing gas 16 can be increased and the hydrogen containing gas 16 can be produced with high energy efficiency.

The hydrocarbon-based gas 14 is not particularly limited as long as the hydrocarbon-based gas 14 contains a carbon atom and a hydrogen atom and can be reformed into the hydrogen containing gas 16 in the catalyst layer 5. For example, a hydrocarbon such as methane, ethane, or propane, an alcohol such as methanol or ethanol, or the like can be used.

Also the oxidant gas 15 is not particularly limited as long as the oxidant gas 15 can react with the hydrocarbon-based gas 14 in the catalyst layer 5 and thus the hydrogen containing gas 16 can be produced. Water vapor obtained by vaporizing water or a molecular oxygen containing gas such as carbon monoxide can be used. However, in terms of reactivity of the hydrocarbon-based gas 14 and the oxidant gas 15, it is preferable that the oxidant gas 15 is one kind of gas or a mixed gas of two or more kinds of gases, selected from water vapor, carbon dioxide gas, and oxygen gas.

The reaction in which the hydrogen containing gas 16 is produced in the catalyst layer 5 is formed from, for example, a reaction in which the hydrocarbon-based gas 14 is decomposed to generate hydrogen, a reaction in which the hydrocarbon-based gas 14 is oxidized by the oxidant gas 15 to generate hydrogen, or the like.

The inventors have found that activation of the hydrocarbon-based gas 14 containing a hydrogen atom is a rate determining factor in the reaction in which the hydrogen containing gas 16 is produced. Therefore, if the frequency of high voltage generated by the external power supply 12 is set by the frequency setting means 13 so as to generate the plasma having such electronic energy that can efficiently promote vibrational excitation of the hydrocarbon-based gas 14, the hydrogen containing gas 16 can be produced with high energy efficiency and the yield of hydrogen gas in the hydrogen containing gas 16 can be increased.

The kind of the catalyst forming the catalyst layer 5 is not particularly limited as long as the hydrocarbon-based gas 14 can be reformed into the hydrogen containing gas 16, and a known catalyst can be used. However, in terms of reactivity, it is preferable to use a catalyst containing a transition metal element such as nickel, iron, or cobalt.

As described above, the gas production system according to embodiment 2 can provide the same effects as in embodiment 1.

Further, in the gas production system according to embodiment 2, even in a case where the hydrocarbon-based gas 14 and the oxidant gas 15 are supplied into the reactor 2 and the hydrocarbon-based gas 14 and the oxidant gas 15 are caused to react through application of plasma in the catalyst layer 5 to produce the hydrogen containing gas 16, the frequency of high voltage generated by the external power supply 12 is set by the frequency setting means 13 in accordance with the hydrocarbon-based gas 14, whereby it is possible to generate plasma having such electronic energy that can efficiently promote vibrational excitation of the hydrocarbon-based gas 14 serving as a rate determining factor in the reaction. Thus, the hydrogen containing gas 16 can be produced with high energy efficiency, and the yield of hydrogen gas in the hydrogen containing gas 16 can be increased.

Embodiment 3

Hereinafter, a gas production system according to embodiment 3 will be described. The configuration and the operation of the gas production system according to embodiment 3 are basically the same as those in embodiment 2, while a difference is that the flow-out portion 7 is provided with depressurizing means 17 and the reactor 2 is provided with a pressure measurement device 18.

Figure 4:
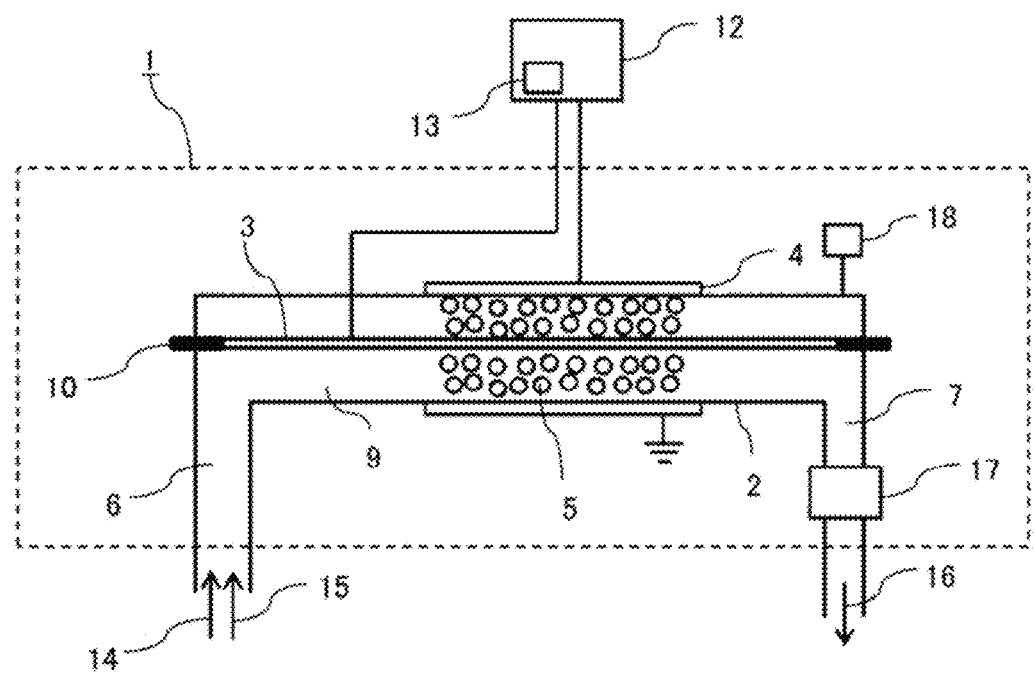
FIG. 4 schematically shows the configuration of a gas production system according to embodiment 3.

FIG. 4 schematically shows the configuration of the gas production system according to embodiment 3. In the drawing, the same components and members as those of the gas production system according to embodiment 2 are denoted by the same reference characters, and description thereof is omitted unless particularly needed.

In the gas production system according to embodiment 3, since the depressurizing means 17 is provided, the pressure in the reactor 2 can be reduced by operating the depressurizing means 17.

As plasma is generated in the catalyst layer 5 provided in the space between the first electrode 3 and the second electrode 4 in the reactor 2, the catalyst forming the catalyst layer 5 is deteriorated with a long period, so that the performance might be significantly reduced. Here, by reducing the pressure in the reactor 2 using the depressurizing means 17, deterioration of the catalyst can be suppressed. The pressure in the reactor 2 can be measured using the pressure measurement device 18, and a control mechanism may be provided for controlling operation of the depressurizing means 17 and motive power for the depressurizing means 17 on the basis of the measured value of the pressure measurement device 18.

Reducing the pressure in the reactor 2 by the depressurizing means 17 also provides an effect of allowing plasma to be readily generated in the catalyst layer 5 provided in the space between the first electrode 3 and the second electrode 4 in the reactor 2. As described above, the magnitude of high voltage generated by the external power supply 12 may be adjusted as appropriate so that plasma can be generated in the frequency range of the high voltage corresponding to the range of electronic energy that can efficiently promote vibrational excitation of the hydrocarbon-based gas 14 by the frequency setting means 13. If the magnitude of high voltage is extremely small, plasma cannot be generated, and on the other hand, if the magnitude of high voltage is extremely great, energy efficiency is reduced. However, by reducing the pressure in the reactor 2 using the depressurizing means 17, it is possible to reduce the lower limit value of the magnitude of high voltage of the external power supply 12 that can generate plasma in the catalyst layer 5. Thus, the magnitude of high voltage of the external power supply 12 is reduced and plasma can be generated with higher energy efficiency.

Here, in a case where the hydrocarbon-based gas 14 and the oxidant gas 15 are caused to react in the catalyst layer 5 to produce the hydrogen containing gas 16, it has been known that a reaction in which the generated hydrogen containing gas 16 returns to the hydrocarbon-based gas 14 and the oxidant gas 15 also occurs. In the reactor 2, the forward reaction in which the hydrocarbon-based gas 14 and the oxidant gas 15 are reformed into the hydrogen containing gas 16, and the backward reaction in which the hydrogen containing gas 16 returns to the hydrocarbon-based gas 14 and the oxidant gas 15, are readily subjected to constraints of equilibrium. The inventors have found that reducing the pressure in the reactor 2 promotes, in the equilibrium theory, the forward reaction in which the hydrocarbon-based gas 14 and the oxidant gas 15 are reformed into the hydrogen containing gas 16 in the reactor 2.

At the same time as the forward reaction in which the hydrocarbon-based gas 14 and the oxidant gas 15 are reformed into the hydrogen containing gas 16, a side reaction in which carbon constituting the hydrocarbon-based gas 14 is deposited on the catalyst surface, also occurs. The carbon deposited on the catalyst surface inhibits the forward reaction of reformation into the hydrogen containing gas 16, so that the yield of hydrogen gas in the hydrogen containing gas 16 is reduced. However, by reducing the pressure in the reactor 2, the side reaction in which carbon is deposited on the catalyst surface can be inhibited. Further, since the oxidant gas 15 undergoes vibrational excitation by plasma, a reaction in which the carbon deposited on the catalyst surface is oxidized to return to a gas such as carbon monoxide gas is promoted, whereby the carbon is efficiently removed from the catalyst surface.

Thus, by reducing the pressure in the reactor 2 using the depressurizing means 17, it is possible to further increase the yield of hydrogen gas in the hydrogen containing gas 16.

The depressurizing means 17 is not particularly limited as long as the inside of the reactor 2 can be depressurized, and for example, a vacuum pump, a cascade pump, an ejector, or the like can be used. Also, the installation position of the depressurizing means 17 is not particularly limited as long as the inside of the reactor 2 can be depressurized. Further, the pressure measurement device 18 is not particularly limited as long as the pressure in the reactor 2 can be measured, and a known pressure gauge such as a Bourdon tube pressure gauge or a digital pressure gauge can be used. In such a case where the pressure in the reactor 2 can be calculated from the motive power, the current value, or the like of the depressurizing means 17 without the pressure measurement device 18, the pressure measurement device 18 can be omitted.

The pressure in the reactor 2 is not particularly limited as long as the pressure is not higher than the atmospheric pressure. However, if the pressure in the reactor 2 is excessively lowered, the hydrocarbon-based gas 14 and the oxidant gas 15 are thinned, so that production performance for the hydrogen containing gas 16 is reduced. Therefore, the pressure in the reactor 2 is, in absolute pressure, preferably not less than 1 Pa and not greater than 100 kPa, and more preferably not less than 100 Pa and not greater than 10 kPa. The pressure in the reactor 2 may be set within the above range as appropriate in accordance with the frequency of high voltage of the external power supply 12 set by the frequency setting means 13. As long as the pressure in the reactor 2 is within the above range, without significant reduction in production performance for the hydrogen containing gas 16, the magnitude of high voltage of the external power supply 12 can be reduced and thus plasma can be generated with higher energy efficiency. Further, in the equilibrium theory, it is possible to promote the forward reaction in which the hydrocarbon-based gas 14 and the oxidant gas 15 are reformed into the hydrogen containing gas 16.

Figure 5:
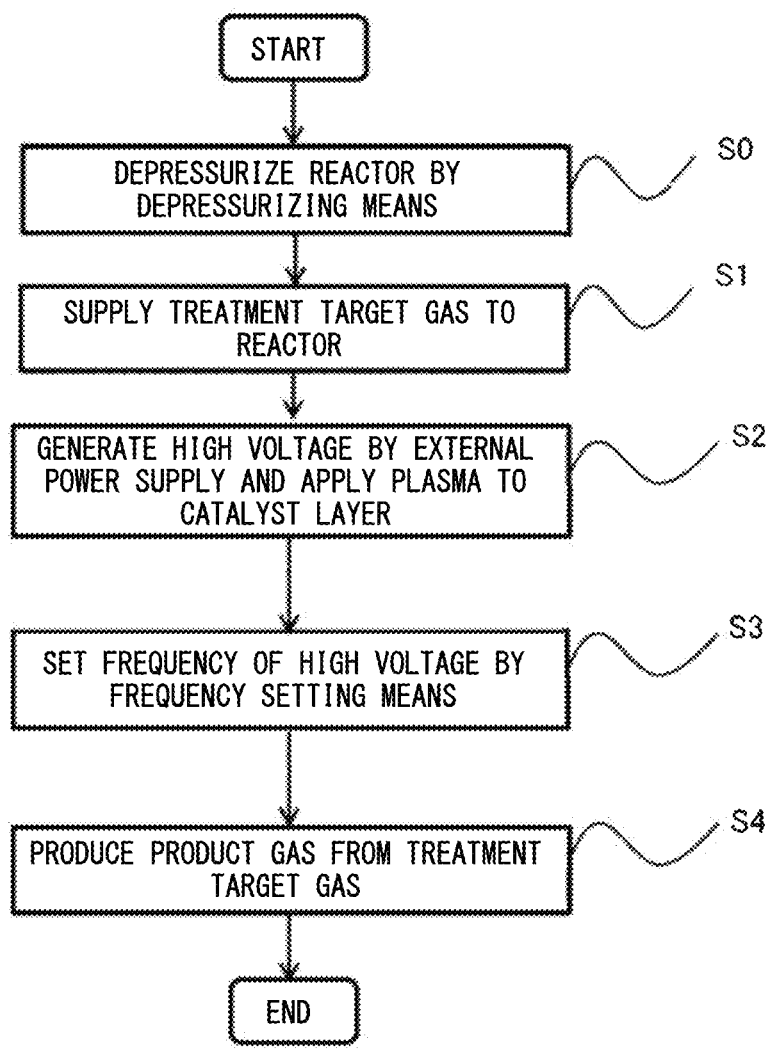
FIG. 5 is a chart showing an operation flow of the gas production system according to embodiment 3.

FIG. 5 is a chart showing an operation flow of the gas production system according to embodiment 3, and shows a production method for the product gas. This gas production method includes a depressurizing step, a gas supply step, a voltage generation step, a plasma application (generation) step, a frequency setting step, and a reforming step. This operation flow corresponds to an operation flow in which the depressurizing step is provided as an initial step before the gas supply step in the operation flow described in FIG. 2 in embodiment 1.

First, in step S0, the pressure in the reactor 2 is reduced to a predetermined value by the depressurizing means 17. This step S0 is an example of the depressurizing step.

Subsequently, in the gas supply step in step S1, the hydrocarbon-based gas 14 and the oxidant gas 15 are supplied to the catalyst layer 5 provided in the space between the first electrode 3 and the second electrode 4 in the reactor 2. This step S1 is an example of the gas supply step.

In step S2, plasma is generated by high voltage generated by the external power supply 12 connected to the first electrode 3 and the second electrode 4, whereby plasma is applied to the catalyst layer 5. This step S2 is an example of the voltage generation step and the plasma application step.

In step S3 after plasma is generated in step S2, the frequency of high voltage generated by the external power supply 12 is set by the frequency setting means 13. The frequency is set in accordance with the treatment target gas 8, whereby the electronic energy of the plasma is set appropriately. This step S3 is an example of the frequency setting step.

At this time, the depressurizing means 17 can be operated in accordance with the frequency, to adjust the pressure so as to be set to a pressure condition in which plasma is readily generated or stably generated. That is, in step S3, the depressurizing step can be performed in combination.

It is noted that, in step S0, the pressure may be set in advance in consideration of the total amount of the gas flow in step S1 and the plasma generation condition.

With the frequency of high voltage set in step S3, the hydrogen containing gas 16 is produced from the hydrocarbon-based gas 14 and the oxidant gas 15 in the catalyst layer 5. When a predetermined product gas amount is reached, the gas production is finished. This step S4 is an example of the reforming step.

As described above, the gas production system according to embodiment 3 can provide the same effects as in embodiments 1 and 2.

Further, in the gas production system according to embodiment 3, the pressure in the reactor 2 is reduced by the depressurizing means 17, whereby deterioration of the catalyst in the catalyst layer 5 is suppressed and also the reaction in which the hydrocarbon-based gas 14 and the oxidant gas 15 are reformed into the hydrogen containing gas 16 is promoted, thus further increasing the yield of hydrogen gas in the hydrogen containing gas 16. In addition, the magnitude of high voltage of the external power supply 12 that can generate plasma can be reduced, whereby the hydrogen containing gas 16 can be produced with higher energy efficiency.

Embodiment 4

Hereinafter, a gas production system according to embodiment 4 will be described. The configuration and the operation of the gas production system according to embodiment 4 are basically the same as those in embodiment 3, while a difference is that temperature adjustment means 19 is provided around the outer circumference of the second electrode 4.

Figure 6:
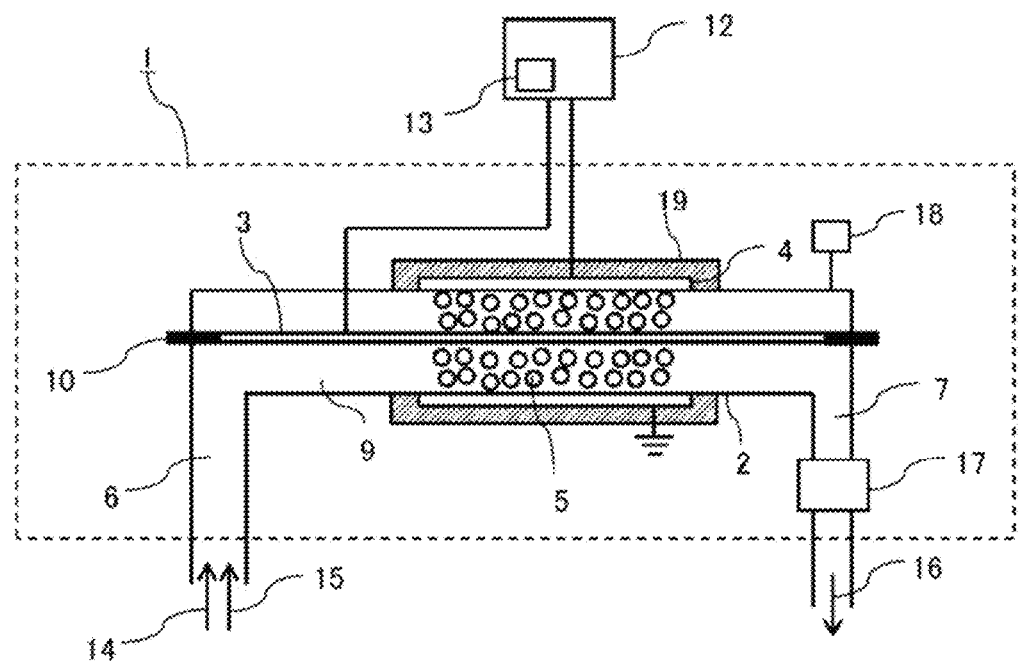
FIG. 6 schematically shows the configuration of a gas production system according to embodiment 4.

FIG. 6 schematically shows the configuration of the gas production system according to embodiment 4. In the drawing, the same components and members as those of the gas production system according to embodiment 3 are denoted by the same reference characters, and description thereof is omitted unless particularly needed.

In the gas production system according to embodiment 4, since the temperature adjustment means 19 is provided around the outer circumference of the second electrode 4, the catalyst layer 5 in the reactor 2 can be adjusted to an appropriate temperature.

A reactivity for the hydrocarbon-based gas 14 and the oxidant gas 15 to be reformed into the hydrogen containing gas 16 is improved also by heating the catalyst layer 5 in the reactor 2. The catalyst layer 5 can be heated by plasma generated in the catalyst layer 5, but if the electronic energy is set so as to efficiently promote vibrational excitation of molecules of the gas reactive material by the frequency setting means 13, most of the plasma energy is used for promoting vibrational excitation of molecules of the gas reactive material and the effect of heating the catalyst layer 5 is small. However, with the temperature adjustment means 19 provided, it is possible to adjust the catalyst layer 5 in the reactor 2 to an appropriate temperature, whereby the reaction in which the hydrocarbon-based gas 14 and the oxidant gas 15 are reformed into the hydrogen containing gas 16 is promoted and thus the yield of hydrogen gas in the hydrogen containing gas 16 can be further increased.

The temperature of the catalyst layer 5 in the reactor 2 may be adjusted in accordance with the yield of hydrogen gas in the hydrogen containing gas 16 required for the subsequent process in the gas production device 1. The temperature is preferably not less than 300° C. and not greater than 800° C., and more preferably not less than 400° C. and not greater than 600° C. If the temperature of the catalyst layer 5 in the reactor 2 is lower than the above range, the reaction in which the hydrocarbon-based gas 14 and the oxidant gas 15 are reformed into the hydrogen containing gas 16 might be significantly reduced. On the other hand, if the temperature of the catalyst layer 5 in the reactor 2 is higher than the above range, the influence of increase in energy consumption due to increase in energy for providing heat to the reactor 2 by the temperature adjustment means 19 becomes more significant than the effect of promoting the reaction in which the hydrocarbon-based gas 14 and the oxidant gas 15 are reformed into the hydrogen containing gas 16, so that energy efficiency is reduced.

The temperature adjustment means 19 is not particularly limited as long as the temperature of the catalyst layer 5 in the reactor 2 can be adjusted to an appropriate value as described above, and for example, a carbon heater, a ceramic heater, a mechanism for circulating hot water through the gas production device 1, or the like may be used as a heat source. Alternatively, the temperature adjustment means 19 may be a mechanism in which low-temperature exhaust heat such as factory exhaust heat or industrial exhaust heat is led through a pipe or the like to be used as a heat source and which heats the reactor 2 through heat exchange. Using such low-temperature exhaust heat makes it possible to improve energy efficiency on a factory basis or a regional basis.

As described above, the gas production system according to embodiment 4 can provide the same effects as in embodiment 3.

Further, in the gas production system according to embodiment 4, the temperature adjustment means 19 is provided, and the catalyst layer 5 in the reactor 2 can be adjusted to an appropriate temperature by the temperature adjustment means 19. Thus, the reaction in which the hydrocarbon-based gas 14 and the oxidant gas 15 are reformed into the hydrogen containing gas 16 is further promoted, whereby the yield of hydrogen gas in the hydrogen containing gas 16 can be further increased.

In the above description, the example in which the temperature adjustment means 19 is further provided to the configuration in embodiment 3 has been shown. However, the temperature adjustment means 19 may be provided to the configuration in embodiment 2.

Embodiment 5

Hereinafter, a gas production system according to embodiment 5 will be described. The configuration and the operation of the gas production system according to embodiment 5 are basically the same as those in embodiment 4, while a difference is that the external power supply 12 is connected to the first electrode 3 and the second electrode 4 via boosting means 20.

Figure 7:
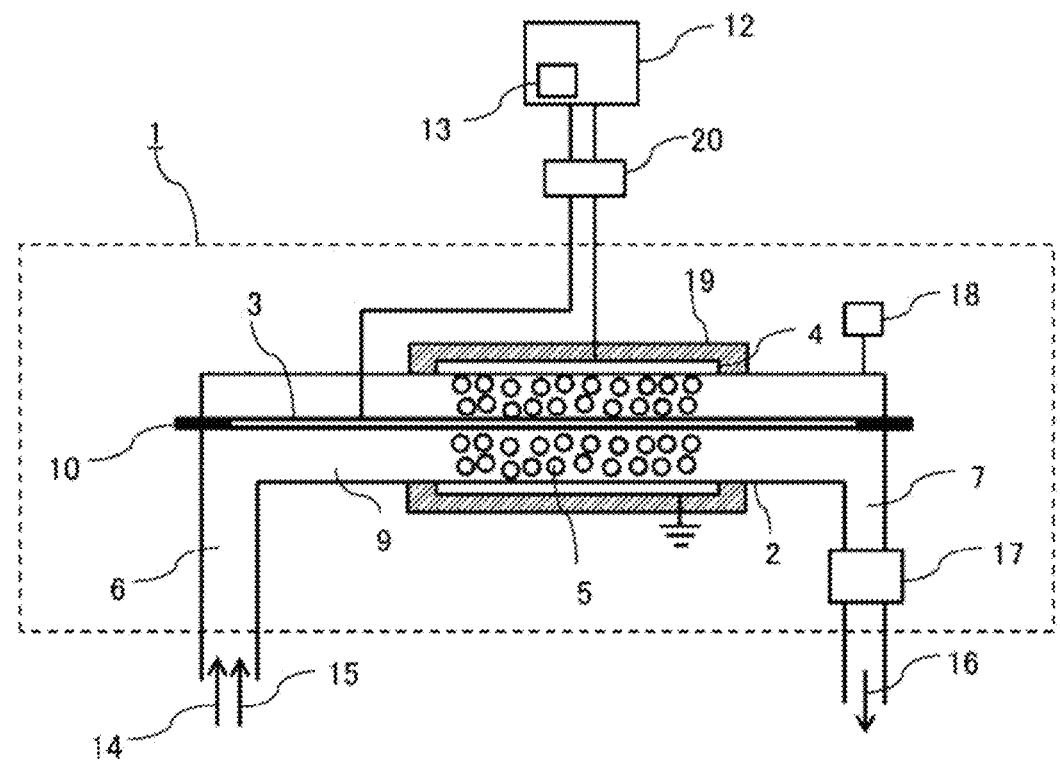
FIG. 7 schematically shows the configuration of a gas production system according to embodiment 5.

FIG. 7 schematically shows the configuration of the gas production system according to embodiment 5. In the drawing, the same components and members as those of the gas production system according to embodiment 4 are denoted by the same reference characters, and description thereof is omitted unless particularly needed.

The gas production system according to embodiment 5 includes the boosting means 20 for further boosting high voltage generated by the external power supply 12.

Depending on the performance of the external power supply 12, if the frequency of high voltage to be generated is great, the magnitude of the high voltage cannot be increased and therefore it might be impossible to generate plasma with the external power supply 12 alone. However, by providing the boosting means 20 for further boosting the high voltage generated by the external power supply 12, high voltage corresponding to the frequency of high voltage of the external power supply 12 set by the frequency setting means 13 can be easily applied between the first electrode 3 and the second electrode 4. Thus, plasma can be stably generated and production of the product gas can be stabilized.

The boosting means 20 is not particularly limited as long as the high voltage generated by the external power supply 12 can be further boosted, and a known configuration such as a transformer may be used.

As described above, the gas production system according to embodiment 5 can provide the same effects as in embodiment 4.

Further, in the gas production system according to embodiment 5, the boosting means 20 for further boosting the high voltage generated by the external power supply 12 is provided, whereby it becomes easy to apply high voltage having a magnitude that can generate plasma, between the first electrode 3 and the second electrode 4, in accordance with the frequency of high voltage of the external power supply 12 set by the frequency setting means 13. Thus, it is possible to stably obtain the effect of increasing the yield of hydrogen gas in the hydrogen containing gas 16 and producing the hydrogen containing gas 16 with high energy efficiency.

In the above description, the example in which the boosting means 20 is further provided to the configuration in embodiment 4 has been shown. However, the same effects are obtained even in a case of providing the boosting means 20 to the configuration in embodiment 2 or 3.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 gas production device
2 reactor
3 first electrode
4 second electrode
5 catalyst layer
6 supply portion
7 flow-out portion
8 treatment target gas
9 flow path
10 supporter
11 product gas
12 external power supply
13 frequency setting means
14 hydrocarbon-based gas
15 oxidant gas
16 hydrogen containing gas
17 depressurizing means
18 pressure measurement device
19 temperature adjustment means
20 boosting means

The invention claimed is:

1. A gas production system which applies plasma to a catalyst and reforms a selected treatment target gas from among a plurality of treatment target gases to produce a product gas, the gas production system comprising:
voltage generation circuitry for generating voltage;
plasma generation circuitry for generating the plasma to be applied to the catalyst, using the voltage generated by the voltage generation circuitry;
frequency setting circuitry for changing and setting a frequency of the voltage used to generate the plasma, based on the selected treatment target gas, to vibrationally excite molecules of gas reactive material constituting the selected treatment target gas to produce the product gas;
a depressurizer to reduce a pressure in a reactor; and
a heat source to heat the catalyst, the heat source being different from the plasma generation circuitry and the plasma, wherein
the selected treatment target gas is a hydrocarbon-based gas and an oxidant gas, and the product gas is a hydrogen containing gas,
the frequency setting circuitry is configured to change and set the frequency of the voltage that is generated by an external power supply, based on the selected treatment target gas, in a range not less than 10 kHz and not greater than 1 MHz, and
the depressurizer sets the pressure in the reactor in accordance with the frequency of the voltage that is generated by the external power supply based on the treatment target gas.

2. The gas production system according to claim 1, further comprising:
a gas producer having a reactor forming a flow path for the selected treatment target gas, a first electrode and a second electrode to which the voltage generated by the voltage generation circuitry is applied, and the catalyst layer in the flow path between the first electrode and the second electrode and containing the catalyst; and
a gas supply to supply the selected treatment target gas to the gas producer, wherein
the voltage generation circuitry is the external power supply connected to the first electrode and the second electrode, and
the frequency setting circuitry sets the frequency of the voltage that is generated by the external power supply, based on the selected treatment target gas, and the plasma is generated between the first electrode and the second electrode based on the voltage changed and set based on the selected treatment target gas.

3. The gas production system according to claim 2, wherein the second electrode and the reactor have cylindrical shapes, an outer circumference of the reactor is coated with the second electrode, and the first electrode is on a center axis of the reactor.

4. The gas production system according to claim 2, wherein the reactor is made from a dielectric material.

5. The gas production system according to claim 1, wherein the depressurizer sets a pressure in a catalyst layer in a range not less than 1 Pa and not greater than 100 kPa.

6. The gas production system according to claim 2, further comprising boosting circuitry for further boosting the voltage that is generated by the external power supply.

7. The gas production system according to claim 1, wherein the oxidant gas is one gas or a mixed gas of two or more gases, selected from water vapor, carbon dioxide gas, and oxygen gas.

8. The gas production system according to claim 1, wherein the catalyst includes one element or two or more elements, selected from a transition metal group.

9. The gas production system according to claim 1, wherein the heat source is low-temperature exhaust heat, and heats the catalyst through heat exchange with the low-temperature exhaust heat.

10. A gas production method in which plasma is applied to a catalyst layer containing a catalyst and a treatment target gas is reformed to produce a product gas, the gas production method comprising:
heating, using a heater, the catalyst layer;
supplying the treatment target gas to the catalyst layer;
generating voltage to generate the plasma;
generating, using plasma generation circuitry, the plasma using the generated voltage, and applying the plasma to the catalyst layer;
setting, using frequency setting circuitry, a frequency of the voltage used to generate the plasma, based on the treatment target gas, to vibrationally excite molecules of gas reactive material constituting the treatment target gas;
reforming the treatment target gas and producing the product gas; and
setting pressure associated with the catalyst layer using a depressurizer, said setting the pressure including the depressurizer reducing a pressure in the catalyst layer, wherein
the selected treatment target gas is a hydrocarbon-based gas and an oxidant gas, and the product gas is a hydrogen containing gas, and
the frequency setting circuitry is configured to change and set the frequency of the voltage that is generated by an external power supply, based on the selected treatment target gas, in a range not less than 10 kHz and not greater than 1 MHz,
the heater is different from the plasma generation circuitry and the plasma, and
said setting the pressure associated with the catalyst layer is in accordance with the frequency of the voltage that is generated by the external power supply based on the treatment target gas.

11. The gas production method according to claim 10, wherein said reducing the pressure in the catalyst layer is performed before said supplying the treatment target gas to the catalyst.

12. A gas production system which applies plasma to a catalyst and reforms a selected treatment target gas from among a plurality of treatment target gases to produce a product gas, the gas production system comprising:
voltage generation circuitry for generating voltage;
plasma generation circuitry for generating the plasma to be applied to the catalyst, using the voltage generated by the voltage generation circuitry;
frequency setting circuitry for changing and setting a frequency of the voltage used to generate the plasma, based on the selected target treatment gas, to vibrationally excite molecules of gas reactive material constituting the selected treatment target gas to produce the product gas;
a depressurizer to reduce a pressure in the reactor; and
a heat source to heat the catalyst, the heat source being different from the plasma generation circuitry and the plasma, wherein
the catalyst includes one element or two or more elements, selected from a transition metal group,
the frequency setting circuitry is configured to change and set the frequency of the voltage that is generated by an external power supply, based on the selected treatment target gas, in a range not less than 10 kHz and not greater than 1 MHz, and
the depressurizer sets the pressure in the reactor in accordance with the frequency of the voltage that is generated by the external power supply based on the treatment target gas.

13. A gas production system which applies plasma to a catalyst and reforms a selected treatment target gas from among a plurality of treatment target gases to produce a product gas, the gas production system comprising:
voltage generation circuitry for generating voltage;
plasma generation circuitry for generating the plasma to be applied to the catalyst, using the voltage generated by the voltage generation circuitry;
frequency setting circuitry for changing and setting a frequency of the voltage used to generate the plasma, based on the selected treatment target gas, to vibrationally excite molecules of gas reactive material constituting the selected treatment target gas to produce the product gas;
a heat source to heat the catalyst, the heat source being different from the plasma generation circuitry and the plasma; and
a depressurizer to reduce a pressure in the reactor, wherein
the frequency setting circuitry is configured to change and set the frequency of the voltage that is generated by an external power supply, based on the selected treatment target gas, in a range not less than 10 kHz and not greater than 1 MHz, and
the depressurizer sets the pressure in the reactor in accordance with the frequency of the voltage that is generated by the external power supply based on the treatment target gas.

14. The gas production system according to claim 1, wherein the hydrocarbon-based gas is the gas reactive material constituting the treatment target gas.

* * * * *